United States Patent [19]

Kaneko et al.

[11] Patent Number: 6,110,858
[45] Date of Patent: Aug. 29, 2000

[54] OLEFIN POLYMERIZATION CATALYSTS AND PROCESS FOR PRODUCING OLEFIN POLYMERS

[75] Inventors: Toshiyuki Kaneko; Akihiro Yano, both of Yokkaichi, Japan

[73] Assignee: Tosoh Corporation, Yamaguchi-ken, Japan

[21] Appl. No.: 08/991,658

[22] Filed: Dec. 16, 1997

[30] Foreign Application Priority Data

Dec. 18, 1996 [JP] Japan .................................. 8-338462
Dec. 18, 1996 [JP] Japan .................................. 8-338463

[51] Int. Cl.$^7$ .................................................. B01J 29/00
[52] U.S. Cl. ................................ 502/62; 502/63; 502/72; 502/73; 502/75; 502/80; 502/85; 502/103; 502/117; 502/118; 502/123; 502/152; 502/153; 502/155; 502/159; 502/162; 502/167
[58] Field of Search .................................. 502/62, 63, 72, 502/73, 75, 80, 85, 103, 117, 118, 123, 152, 153, 155, 159, 162, 167

[56] References Cited

U.S. PATENT DOCUMENTS

| | | |
|---|---|---|
| 4,542,199 | 9/1985 | Kaminsky et al. . |
| 4,937,299 | 6/1990 | Ewen et al. . |
| 5,084,534 | 1/1992 | Welborn et al. . |
| 5,198,512 | 3/1993 | Jackson et al. . |
| 5,308,811 | 5/1994 | Suga et al. . |
| 5,374,700 | 12/1994 | Tsutsui et al. . |
| 5,830,820 | 11/1998 | Yano et al. ................. 502/62 |
| 5,906,955 | 5/1999 | Hamura et al. ............ 502/103 |

FOREIGN PATENT DOCUMENTS

| | | |
|---|---|---|
| 0 658 576 A1 | 6/1995 | European Pat. Off. . |
| 786 466 A1 | 7/1997 | European Pat. Off. . |
| 58-019309 | 2/1983 | Japan . |
| 60-035006 | 2/1985 | Japan . |
| 7-309907 | 11/1988 | Japan . |
| 1-501950 | 7/1989 | Japan . |
| 1-502036 | 7/1989 | Japan . |
| 1-503788 | 12/1989 | Japan . |
| 4-008704 | 1/1992 | Japan . |
| 4-011604 | 1/1992 | Japan . |
| 4-213305 | 8/1992 | Japan . |
| 5-301917 | 11/1993 | Japan . |
| 7-224106 | 8/1995 | Japan . |
| WO 88/05792 | 8/1988 | WIPO . |
| WO 88/05793 | 8/1988 | WIPO . |

*Primary Examiner*—Elizabeth D. Wood
*Attorney, Agent, or Firm*—Liniak, Berenato, Longacre & White

[57] ABSTRACT

Catalysts for olefin polymerization which consist essentially of a transition metal compound, a modified clay compound and an organic aluminum compound, wherein the modified clay compound comprises a reaction product of a clay mineral and a proton acid salt of a specific amine compound, as well as a method of polymerizing olefins using such catalysts. It is possible thereby to obtain olefin polymers with high productivity and low ash content.

2 Claims, No Drawings

OLEFIN POLYMERIZATION CATALYSTS AND PROCESS FOR PRODUCING OLEFIN POLYMERS

BACKGROUND OF THE INVENTION

1. Field of the Invention

The present invention relates to an olefin polymerization catalyst, which comprises a transition metal compound, a modified clay compound and an organic aluminum compound, and to a process, for producing olefin polymers, which employs the catalyst.

2. Description of the Related Art

The use of catalyst systems comprising combinations of transition metal compounds and organic metal compounds is already known in methods of producing polyolefins by olefin polymerization. Kaminsky et al. have disclosed in Japanese Unexamined Patent Publication No. 58-19309 that catalysts employing metallocene and methylaluminoxane exhibit high activity for the production of olefin polymers such as propylene.

However, although the catalyst system disclosed in this publication is excellent for polymerization activation, because the catalyst system is soluble in the reaction system it is common to employ a solution polymerization system which, however, not only restricts the production process but also necessitates the use of large quantities of relatively costly methylaluminoxane in order to produce polymers with industrially useful properties. Consequently, the problems of cost and high levels of aluminum residues in the polymers have to be dealt with when employing such catalyst systems.

A catalyst system wherein the aforementioned soluble catalyst system is borne on an inorganic oxide carrier such as silica is disclosed in Japanese Unexamined Patent Publication No. 60-35006. However, the polymer activity per amount of methylaluminoxane has still been insufficient even when the olefins are polymerized by the process described here.

Methods for improvement include those disclosed in, for example, Japanese Unexamined Patent Publications No. 4-8704, No. 4-11604, and No. 4-213305, wherein catalyst systems prepolymerized with a small amount of methylaluminoxane are used for gas phase polymerization to obtain polymers with excellent polymerization activity and satisfactory particulate form. However, despite the advantage of a reduced amount of methylaluminoxane, the polymerization activity has still been less than satisfactory, and therefore a higher activation of catalyst systems has been a desired goal.

Also, Japanese Unexamined Patent Publication No. 1-503788 describes a method for producing ethylene/α-olefin copolymers by a high pressure/high temperature process employing as the catalyst a transition metal compound and aluminoxane. This method, however, presents problems regarding the use of the catalysts on a large industrial scale, given the difficulty of synthesizing methylaluminoxane in a reproducible manner as mentioned above, and the fact that in spite of the high cost of methylaluminoxane, the amount of the methylaluminoxane used must be increased considerably with respect to the transition metal compound in order to achieve sufficient activity.

Recently, new promoter catalysts have been studied which do not employ organic aluminum oxy compounds such as methylaluminoxane, and for example, special boron compounds have been disclosed as effective promoter catalysts in Japanese Patent National Publications No. 1-501950 and No. 1-502036. Nevertheless, because these boron compounds are highly complex compounds, the problem of cost has not been resolved.

Japanese Unexamined Patent Publications No. 5-301917 and No. 7-309907 disclose catalyst systems employing inexpensive clay or clay treated with inorganic salts. The olefin polymerization activity in these catalyst systems, however, has been less than adequate.

Also, Japanese Unexamined Patent Publication No. 7-224106 teaches that a high activity catalyst system can be obtained by using an interlayer cation modified clay prepared by reacting clay with an organic cation, for the purpose of actively utilizing the surface negative charge of the clay minerals as a promoting catalyst; however, in terms of ash content or process applicability when considering actual production, it has been desirable to develop catalyst systems with even higher activity and better polymerization behavior, which can be used at high temperature and in solution polymerization processes wherein the residence time of catalysts is longer. It has also been desired for the interlayer cation-modified clay in such catalysts to have better storage stability.

SUMMARY OF THE INVENTION

It is therefore an object of the present invention to provide a catalyst for olefin polymerization which is inexpensive and has excellent polymerization activity and polymerization behavior.

It is a further object of the present invention to provide catalysts for olefin polymerization which are inexpensive and have excellent polymerization activity and polymerization behavior, while also having improved storage stability of the modified clay compounds as the structural components in the catalysts for olefin polymerization.

The objects of the invention as set forth above can be achieved according to the present invention, by using a specific clay compound obtained by modifying a clay mineral with a proton acid salt of an amine compound having a specific structure in a catalyst system comprising a modified clay compound, a transition metal compound and an organic aluminum compound.

In other words, the present invention provides a catalyst for olefin polymerization which consists essentially of a transition metal compound (a), a modified clay compound (b) and an organic aluminum compound (c), wherein the modified clay compound (b) comprises a reaction product of (b-1) and a proton acid salt of (b-2) which are defined below, as well as a process for producing olefin polymers using the catalyst. (b-1) clay mineral, (b-2) amine compound represented by the following general formula (1) or (2)

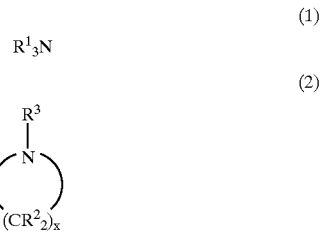

wherein $R^1$ represents a hydrogen atom or an alkyl, alkenyl, aralkyl or other hydrocarbon group of 1–20 carbon atoms, each of which may be the same or different provided that at least one $R^1$ is a hydrocarbon group of 6 or more carbon atoms, $R^2$ and $R^3$ may be the same or different and each represent a hydrogen atom or a hydrocarbon group of 1–20 carbon atoms, and x is 4 or 5.

The present invention further provides a catalyst for olefin polymerization which consists essentially of a transition metal compound (a), a modified clay compound (b) and an organic aluminum compound (c), wherein the modified clay compound (b) comprises a reaction product of (b-1) and a proton acid salt of (b-3) which are defined below, as well as a process for producing olefin polymers using the catalyst. The (b-1) clay material, (b-3) amine compound are represented by the following general formula (3)

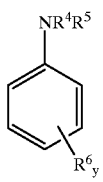

(3)

wherein $R^4$ and $R^5$ each represent a hydrogen atom or a hydrocarbon group of 1–20 carbon atoms, and each may be the same or different, $R^6$ represents a hydrocarbon, oxygen-containing hydrocarbon or nitrogen-containing hydrocarbon group of 1–20 carbon atoms, a silicon-containing hydrocarbon group of 3–20 carbon atoms or a halogen atom, and each may be the same or different, or the 2 $R^6$ groups may together form a ring, and y is 1 or 2.

DESCRIPTION OF THE PREFERRED EMBODIMENT

The present invention will now be explained in more detail.

The transition metal compound (a) is preferably a compound of a transition metal of Group 4 of the periodic table which is represented by the following general formula (4) or (5)

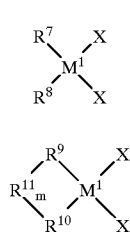

(4)

(5)

wherein $M^1$ is a titanium, zirconium or hafnium atom, each X is independently a hydrogen or halogen atom, an alkyl group of 1–20 carbon atoms or an aryl, arylalkyl or alkylaryl group of 6–20 carbon atoms, and $R^7$ and $R^8$ each independently represent a ligand represented by the following general formula (6), (7), (8) or (9)

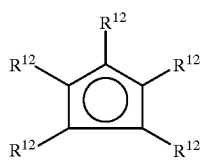

(6)

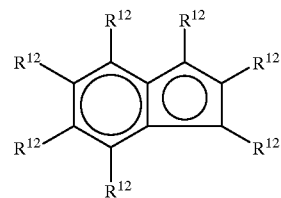

(7)

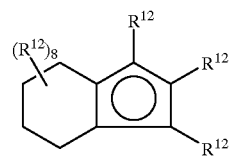

(8)

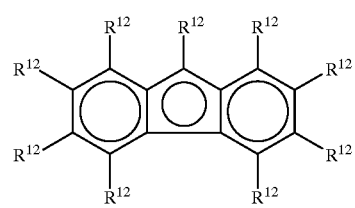

(9)

wherein each $R^{12}$ is independently a hydrogen atom, an alkyl group of 1–20 carbon atoms or an aryl, arylalkyl or alkylaryl group of 6–20 carbon atoms, which ligand forms a sandwich structure together with $M^1$;

$R^9$ and $R^{10}$ each independently represent a ligand represented by the following general formula (10), (11), (12) or (13)

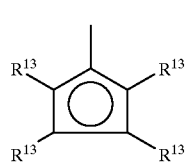

(10)

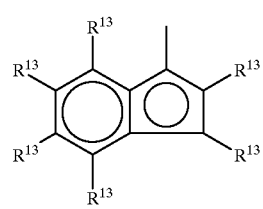

(11)

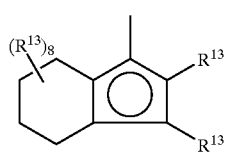

(12)

-continued

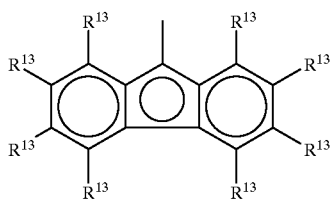
(13)

wherein each $R^{13}$ is independently a hydrogen atom, an alkyl group of 1–20 carbon atoms or an aryl, arylalkyl or alkylaryl group of 6–20 carbon atoms, which ligand forms a sandwich structure together with $M^1$;

and $R^{11}$ is represented by the following general formula (14) or (15)

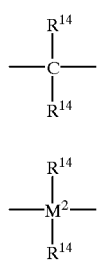
(14)

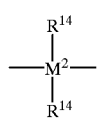
(15)

wherein each $R^{14}$ independently represents a hydrogen atom, an alkyl group of 1–20 carbon atoms or an aryl, arylalkyl or alkylaryl group of 6–20 carbon atoms, and $M^2$ is a silicon, lgermanium or tin atom, and forms a bridge between $R^9$ and $R^{10}$, m being an integer of 1–5, and when m is 2 or greater each $R^{11}$ is independent;

or a compound of a transition metal of Group 4 of the periodic table which is represented by the following general formula (16), (17), (18) or (19)

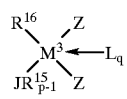
(16)

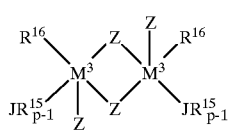
(17)

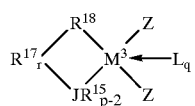
(18)

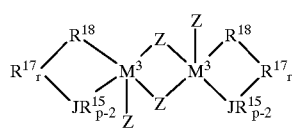
(19)

wherein each $M^3$ is independently a titanium, zirconium or hafnium atom, each Z is independently a hydrogen or halogen atom, an alkyl group of 1–20 carbon atoms or an aryl, arylalkyl or alkylaryl group of 6–20 carbon atoms, L is a Lewis base, q is 0–3, $JR^{15}_{p-1}$ and $JR^{15}_{p-2}$ are hetero atom ligands, J is an element of Group 15 of the periodic table with a coordination number of 3 or an element of Group 16 of the periodic table with a coordination number of 2, each $R^{15}$ is independently a hydrogen or halogen atom, an alkyl or alkoxy group of 1–20 carbon atoms or an aryl, aryloxy, arylalkyl, arylalkoxy, alkylaryl or alkylaryloxy group of 6–20 carbon atoms, p is the coordination number of element J, $R^{16}$ is a ligand represented by the following general formula (20), (21), (22) or (23)

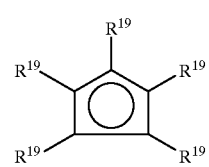
(20)

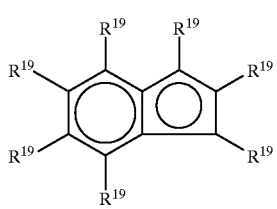
(21)

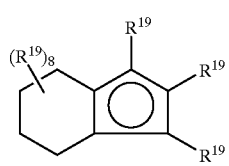
(22)

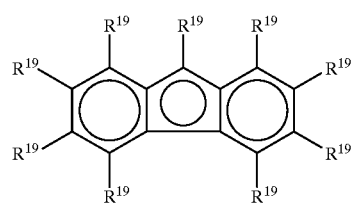
(23)

wherein each $R^{19}$ is independently a hydrogen atom, an alkyl group of 1–20 carbon atoms or an aryl, arylalkyl or alkylaryl group of 6–20 carbon atoms, $R^{18}$ is a ligand represented by the following general formula (24), (25), (26) or (27)

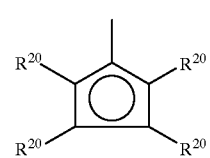
(24)

-continued

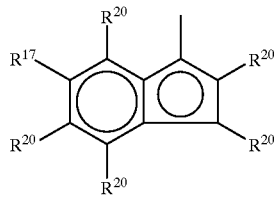
(25)

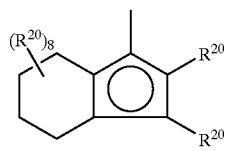
(26)

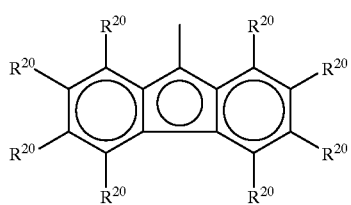
(27)

wherein each $R^{20}$ is independently a hydrogen atom, an alkyl group of 1–20 carbon atoms or an aryl, arylalkyl or alkylaryl group of 6–20 carbon atoms, and $R^{17}$ is represented by the following general formula (28) or (29)

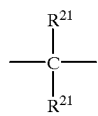
(28)

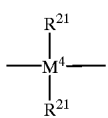
(29)

wherein each $R^{21}$ independently represents a hydrogen atom, an alkyl group of 1–20 carbon atoms or an aryl, arylalkyl or alkylaryl group of 6–20 carbon atoms, and $M^4$ is a silicon, germanium or tin atom, and forms a bridge between $R^{18}$ and $JR^{15}_{p-2}$, r being an integer of 1–5, and when r is 2 or greater each $R^{17}$ is independent.

As compounds represented by the aforementioned general formulas (4) and (5) there may be mentioned dichlorides such as bis(cyclopentadienyl) titanium dichloride, bis(cyclopentadienyl) zirconium dichloride, bis(cyclopentadienyl) hafnium dichloride, bis(methylcyclopentadienyl) titanium dichloride, bis(methylcyclopentadienyl) zirconium dichloride, bis(methylcyclopentadienyl) hafnium dichloride, bis(butylcyclopentadienyl) titanium diciloride, bis(butylcyclopentadienyl) zirconium dichloride, bis(butylcyclopentadienyl) hafnium dichloride, bis(pentamethylcyclopentadienyl) titanium dichloride, bis(pentamethylcyclopentadienyl) zirconium dichloride, bis(pentamethylcyclopentadienyl) hafnium dichloride, bis(indenyl) titanium dichloride, bis(indenyl) zirconium dichloride, bis(indenyl) hafnium dichloride, methylenebis(cyclopentadienyl) titanium dichloride, methylenebis(cyclopentadienyl) zirconium dichloride, ethylenebis(cyclopentadienyl) hafnium dichioride, methylenebis(methylcyclopentadienyl) titanium dichloride, methylenebis(methylcyclopentadienyl) zirconium dichioride, methylenebis(methylcyclopentadienyl) hafnium dichloride, methylenebis(butylcyclopentadienyl) titanium dichioride, methylenebis (butylcyclopentadienyl) zirconium dichloride, methylenebis (butylcyclopentadienyl) hafnium dichloride, methylenebis(tetramethylcyclopentadienyl) titanium dichloride, methylenebis(tetramethylcyclopentadienyl) zirconium dichloride, methylenebis(tetramethylcyclopentadienyl) hafnium dichloride, ethylenebis(indenyl) titanium dichloride, ethylenebis(indenyl) zirconium dichloride, ethylenebis(indenyl) hafnium dichloride, ethylenebis(tetrahydroindenyl) titanium dichloride, ethylenebis(tetrahydroindenyl) zirconium dichloride, ethylenebis(tetrahydroindenyl) hafnium dichloride, ethylenebis(2-methyl-1-indenyl) titanium dichloride, ethylenebis(2-methyl-1-indenyl) zirconium dichloride, ethylenebis(2-methyl-1-indenyl) hafnium dichloride, isopropylidene(cyclopentadienyl-9-fluorenyl) titanium dichloride, isopropylidene(cyclopentadienyl-9-fluorenyl) zirconium dichloride, isopropylidene(cyclopentadienyl-9-fluorenyl) hafnium dichloride, isopropylidene(cyclopentadienyl-2,7-dimethyl-9-fluorenyl) titanium dichloride, isopropylidene(cyclopentadienyl-2,7-dimethyl-9-fluorenyl) zirconium dichloride, isopropylidene (cyclopentadienyl-2,7-dimethyl-9-fluorenyl) hafnium dichloride, isopropylidene(cyclopentadienyl-2,7-di-t-butyl-9-fluorenyl) titanium dichloride, isopropylidene (cyclopentadienyl-2,7-di-t-butyl-9-fluorenyl) zirconium dichloride, isopropylidene(cyclopentadienyl-2,7-di-t-butyl-9-fluorenyl) hafnium dichloride, diphenylmethylene(cyclopentadienyl-9-fluorenyl) titanium dichloride, diphenylmethylene(cyclopentadienyl-9-fluorenyl) zirconium dichloride, diphenylmethylene(cyclopentadienyl-9-fluorenyl) hafnium dichloride, diphenylmethylene(cyclopentadienyl-2,7-dimethyl-9-fluorenyl) titanium dichloride, diphenylmethylene(cyclopentadienyl-2,7-dimethyl-9-fluorenyl) zirconium dichloride, diphenylmethylene(cyclopentadienyl-2,7-dimethyl-9-fluorenyl) hafnium dichloride, diphenylmethylene(cyclopentadienyl-2,7-di-t-butyl-9-fluorenyl) titanium dichloride, diphenylmethylene(cyclopentadienyl-2,7-di-t-butyl-9-fluorenyl) zirconium dichloride, diphenylmethylene(cyclopentadienyl-2,7-di-t-butyl-9-fluorenyl) hafnium dichloride, dimethylsilanediylbis(cyclopentadienyl) titanium dichloride, dimethylsilanediylbis(cyclopentadienyl) zirconium dichloride, dimethylsilanediylbis(cyclopentadienyl) hafnium dichloride, dimethylsilanediylbis(methylcyclopentadienyl) titanium dichloride, dimethylsilanediylbis(methylcyclopentadienyl) zirconium dichloride, dimethylsilanediylbis(methylcyclopentadienyl) hafnium dichloride, dimethylsilanediylbis(butylcyclopentadienyl) titanium dichloride, dimethylsilanediylbis(butylcyclopentadienyl) zirconium dichloride, dimethylsilanediylbis(butylcyclopentadienyl) hafnium dichloride, dimethylsilanediylbis(2,4,5-trimethylcyclopentadienyl) titanium dichloride, dimethylsilanediylbis(2,4-dimethylcyclopentadienyl) titanium dichloride, dimethylsilanediylbis(3-methylcyclopentadienyl) titanium dichloride, dimethylsilanediylbis(4-t-butyl-2-methylcyclopentadienyl) titanium dichloride, dimethylsilanediylbis(tetramethylcyclopentadienyl) titanium dichloride, dimethylsilanediylbis(indenyl) titanium dichloride, dimethylsilanediylbis(2-methyl-1-indenyl) titanium dichloride, dimethylsilanediylbis(tetrahydroindenyl) titanium dichloride, dimethylsilanediyl(cyclopentadienyl-9-fluorenyl) titanium dichloride, dimethylsilanediyl (cyclopentadienyl-2,7-dimethyl-9-fluorenyl) titanium dichloride, dimethylsilanediyl(cyclopentadienyl-2,7-di-t-butyl-9-fluorenyl) titanium dichloride, dimethylsilanediylbis(2,4,5-trimethylcyclopentadienyl) zirconium dichloride, dimethylsilanediylbis(2,4-dimethylcyclopentadienyl) zirconium dichloride, dimethylsilanediylbis(3-methylcyclopentadienyl) zirconium dichloride, dimethylsilanediylbis(4-t-butyl-2-methylcyclopentadienyl) zirconium dichloride, dimethylsilanediylbis(tetramethylcyclopentadienyl) zirconium dichloride, dimethylsilanediylbis(indenyl) zirconium dichloride, dimethylsilanediylbis(2-methyl-1-indenyl) zirconium dichloride, dimethylsilanediylbis (tetrahydroindenyl) zirconium dichloride, dimethylsilanediyl(cyclopentadienyl-9-fluorenyl) zirconium dichloride, dimethylsilanediyl(cyclopentadienyl-2,7-dimethyl-9-fluorenyl) zirconium dichloride, dimethylsilanediyl(cyclopentadienyl-2,7-di-t-butyl-9-fluorenyl) zirconium dichloride, dimethylsilanediylbis(2,4,5-trimethylcyclopentadienyl) hafnium dichloride, dimethylsilanediylbis(2,4-dimethylcyclopentadienyl) hafnium dichloride, dimethylsilanediylbis(3-methylcyclopentadienyl) hafnium dichloride, dimethylsilanediylbis(4-t-butyl-2-methylcyclopentadienyl) hafnium dichloride, dimethylsilanediylbis (tetramethylcyclopentadienyl) hafnium dichloride, dimethylsilanediylbis(indenyl) hafnium dichloride, dimethylsilanediylbis(2-methyl-1-indenyl) hafnium dichloride, dimethylsilanediylbis(tetrahydroindenyl) hafnium dichloride, dimethylsilanediyl(cyclopentadienyl-9-fluorenyl) hafnium dichloride, dimethylsilanediyl (cyclopentadienyl-2,7-dimethyl-9-fluorenyl) hafnium dichloride, dimethylsilanediyl(cyclopentadienyl-2,7-di-t-butyl-9-fluorenyl) hafnium dichloride, diethylsilanediylbis (2,4,5-trimethylcyclopentadienyl) titanium dichloride, diethylsilanediylbis(2,4-dimethylcyclopentadienyl) titanium dichloride, diethylsilanediylbis(3-methylcyclopentadienyl) titanium dichloride, diethylsilanediylbis(4-t-butyl-2-methylcyclopentadienyl) titanium dichloride, diethylsilanediylbis(tetramethylcyclopentadienyl) titanium dichloride, diethylsilanediylbis(indenyl) titanium dichloride, diethylsilanediylbis(2-methyl-1-indenyl) titanium dichloride, diethylsilanediylbis(tetrahydroindenyl) titanium dichloride, diethylsilanediyl(cyclopentadienyl-9-fluorenyl) titanium dichloride, diethylsilanediyl (cyclopentadienyl-2,7-dimethyl-9-fluorenyl) titanium dichloride, diethylsilanediyl(cyclopentadienyl-2,7-di-t-butyl-9-fluorenyl) titanium dichloride, diethylsilanediylbis (2,4,5-trimethylcyclopentadienyl) zirconium dichloride, diethylsilanediylbis(2,4-dimethylcyclopentadienyl) zirconium dichloride, diethylsilanediylbis(3-methylcyclopentadienyl zirconium dichloride, diethylsilanediylbis(4-t-butyl-2-methylcyclopentadienyl) zirconium dichloride, diethylsilanediylbis (tetramethylcyclopentadienyl) zirconium dichloride, diethylsilanediylbis(indenyl) zirconium dichloride, diethylsilanediylbis(2-methyl-1-indenyl) zirconium dichloride, diethylsilanediylbis(tetrahydroindenyl) zirconium dichloride, diethylsilanediyl(cyclopentadienyl-9-fluorenyl) zirconium dichloride, diethylsilanediyl (cyclopentadienyl-2,7-dimethyl-9-fluorenyl) zirconium dichloride, diethylsilanediyl(cyclopentadienyl-2,7-di-t-butyl-9-fluorenyl) zirconium dichloride, diethylsilanediylbis (2,4,5-trimethylcyclopentadienyl) hafnium dichloride, diethylsilanediylbis(3-methylcyclopentadienyl) hafnium dichloride, diethylsilanediylbis(4-t-butyl-2-methylcyclopentadienyl) hafnium dichloride, diethylsilanediylbis(tetramethylcyclopentadienyl) hafnium dichloride, diethylsilanediylbis(indenyl) hafnium dichloride, diethylsilanediylbis(2-methyl-1-indenyl) hafnium dichloride, diethylsilanediylbis(tetrahydroindenyl) hafnium dichloride, diethylsilanediyl(cyclopentadienyl-9-fluorenyl) hafnium dichloride, diethylsilanediyl (cyclopentadienyl-2,7-dimethyl-9-fluorenyl) hafnium dichloride, diethylsilanediyl(cyclopentadienyl-2,7-di-t-butyl-9-fluorenyl) hafnium dichloride, diphenylsilanediylbis (2,4,5-trimethylcyclopentadienyl) titanium dichloride, diphenylsilanediylbis(2,4-dimethylcyclopentadienyl) titanium dichloride, diphenylsilanediylbis(3-methylcyclopentadienyl) titanium dichloride, diphenylsilanediylbis(4-t-butyl-2-methylcyclopentadienyl) titanium dichloride, diphenylsilanediylbis (tetramethylcyclopentadienyl) titanium dichloride, diphenylsilanediylbis(indenyl) titanium dichloride, diphenylsilanediylbis(2-methyl-1-indenyl) titanium dichloride, diphenylsilanediylbis(tetrahydroindenyl) titanium dichloride, diphenylsilanediyl(cyclopentadienyl-9-fluorenyl) titanium dichloride, diphenylsilanediyl (cyclopentadienyl-2,7-dimethyl-9-fluorenyl) titanium dichloride, diphenylsilanediyl(cyclopentadienyl-2, 7-di-t-butyl-9-fluorenyl) titanium dichloride, diphenylsilanediylbis (2,4,5-trimethylcyclopentadienyl) zirconium dichloride, diphenylsilanediylbis(2,4-dimethylcyclopentadienyl) zirconium dichloride, diphenylsilanediylbis(3-methylcyclopentadienyl) zirconium dichloride, diphenylsilanediylbis(4-t-butyl-2-methylcyclopentadienyl) zirconium dichloride, diphenylsilanediylbis (tetramethylcyclopentadienyl) zirconium dichloride, diphenylsilanediylbis(indenyl) zirconium dichloride, diphenylsilanediylbis(2-methyl-1-indenyl) zirconium dichloride, diphenylsilanediylbis(tetrahydroindenyl) zirconium dichloride, diphenylsilanediyl(cyclopentadienyl-9-fluorenyl) zirconium dichloride, diphenylsilanediyl (cyclopentadienyl-2,7-dimethyl- 9-fluorenyl) zirconium dichloride, diphenylsilanediyl(cyclopentadienyl-2,7-di-t-butyl-9-fluorenyl) zirconium dichloride, diphenylsilanediylbis(2,4,5-trimethylcyclopentadienyl) hafnium dichloride, diphenylsilanediylbis(3-methylcyclopentadienyl hafnium dichloride, diphenylsilanediylbis(4-t-butyl-2-methylcyclopentadienyl) hafnium dichloride, diphenylsilanediylbis (tetramethylcyclopentadienyl) hafnium dichloride, diphenylsilanediylbis(indenyl) hafnium dichloride, diphenylsilanediylbis(2-methyl-1-indenyl) hafnium dichloride, diphenylsilanediylbis(tetrahydroindenyl) hafnium dichloride, diphenylsilanediyl(cyclopentadienyl-9-fluorenyl) hafnium dichloride, diphenylsilanediyl (cyclopentadienyl-2,7-dimethyl-9-fluorenyl) hafnium dichloride and diphenylsilanediyl(cyclopentadienyl-2,7-di-t-butyl-9-fluorenyl) hafnium dichloride; as well as dimethyl compounds, diethyl compounds, dihydro compounds, diphenyl compounds and dibenzyl compounds of the aforementioned Group 4 transition metals.

As compounds represented by the aforementioned general formulas (16), (17), (18) and (19) there may be mentioned chlorides such as pentamethylcyclopentadienyl-di-t-butylphosphinotitanium dichloride, pentamethylcyclopentadienyl-di-t-butylamidotitanium dichloride, pentamethylcyclopentadienyl-n- butoxidotitanium dichloride, pentamethylcyclopentadienyl-di-t-butylphosphinozirconium dichloride, pentamethylcyclopentadienyl-di-t-butylamidozirconium dichloride, pentamethylcyclopentadienyl-n-butoxidozirconium dichloride, pentamethylcyclopentadienyl-di-t-butylphosphinohafnium dichloride, pentamethylcyclopentadienyl-di-t-butylamidohafnium dichloride, pentamethylcyclopentadienyl-n-butoxidohafnium dichloride, dimethylsilanediyltetramethylcyclopentadienyl-t-butylamidotitanium dichloride, dimethylsilanediyl-t-butyl-cyclopentadienyl-t-butylamidotitanium dichloride, dimethylsilanediyltrimethylsilylcyclopentadienyl-t-butylamidotitanium dichloride, dimethylsilanediyltetramethylcyclopentadienylphenylamidotitanium dichloride, methylphenylsilanediyltetramethylcyclopentadienyl-t-butylamidotitanium dichloride, dimethylsilanediyltetramethylcyclopentadienyl-p-n-butylphenylamidotitanium dichloride, dimethylsilanediyltetramethylcyclopentadienyl-p-methoxyphenylamidotitanium dichloride, dimethylsilanediyl-t-butylcyclopentadienyl-2,5-di-t-butyl-phenylamidotitanium dichloride, dimethylsilanediylindenyl-t-butylamidotitanium dichloride, dimethylsilanediyltetramethyl-cyclopentadienylcyclohexylamidotitanium dichloride, dimethylsilanediylfluorenylcyclohexylamidotitanium dichloride, dimethylsilanediyltetramethyl-cyclopentadienylcyclododecylamidotitanium dichloride, dimethylsilanediyltetramethylcyclopentadienyl-t-butylamidozirconium dichloride, dimethylsilanediyl-t-butyl-cyclopentadienyl-t-butylamidozirconium dichloride, dimethylsilyltrimethylsilanediylcyclopentadienyl-t-butylamidozirconium dichloride, dimethylsilanediyltetramethylcyclopentadienylphenylamidoz irconium dichloride, methylphenylsilanediyltetramethylcyclopentadienyl-t-butylamidozirconium dichloride, dimethylsilanediyltetramiethylcyclopentadienyl-p-n-butylphenylamidozirconium dichloride, dimethylsilanediyltetramethylcyclopentadienyl-p-methoxyphenylamidozirconium dichloride, dimethylsilanediyl-t-butylcyclopentadienyl-2,5-di-t-butyl-phenylamidozirconium dichloride, dimethylsilanediylindenyl-t-butylamidozirconium dichloride, dimethylsilanediyltetramethyl-cyclopentadienylcyclohexylamidozirconium dichloride, dimethylsilanediylfluorenylcyclohexylamidozirconium dichloride, dimethylsilanediyltetramethyl-cyclopentadienylcyclododecylamidozirconium dichloride, dimethylsilanediyltetramethylcyclopentadienyl-t-butylamidohafnium dichloride, dimethylsilanediyl-t-butylcyclopentadienyl-t-butylamidohafnium dichloride, dimethylsilanediyltrimethylsilylcyclopentadienyl-t-butylamidohafnium dichloride, dimethylsilanediyltetramethylcyclopentadienylphenylamidoh afnium dichloride, methylphenylsilanediyltetramethylcyclopentadienyl-t-butylamidohafnium dichloride, dimethylsilanediyltetramethylcyclopentadienyl-p-n-butylphenylamidohafnium dichloride, dimethylsilanediyltetramethylcyclopentadienyl-p-methoxyphenylamidohafnium dichloride, dimethylsilanediyl-t-butylcyclopentadienyl-2,5-di-t-butyl-phenylamidohafnium dichloride, dimethylsilanediylindenyl-t-butylamidohafnium dichloride, dimethylsilanediyltetramethyl-cyclopentadienylcyclohexylamidohafnium dichloride, dimethylsilanediylfluorenylcyclohexylamidohafnium dichloride and dimethylsilanediyltetramethyl-cyclopentadienylcyclododecylamidohafnium dichloride; as well as dimethyl compounds, diethyl compounds, dihydro compounds, diphenyl compounds and dibenzyl compounds of the aforementioned Group 4 transition metals.

The modified clay compound (b) used according to the present invention is a reaction product between a clay mineral (b-1) and the proton acid salt of an amine compound (b-2) or (b-3).

The clay minerals are generally inorganic polymeric compounds composed of tetrahedrons formed by oxygen ions coordinated with silicon ions and octahedrons formed by oxygen or hydroxide ions coordinated with aluminum, magnesium or other metal ions, and the skeletal structure of most clay minerals is not electrically neutral but is covered with either a negative or positive charge on the surface. Cations are present between the layers to compensate for the negative charge, but ion exchange of these interlayer cations with other cations is possible. The amount of interlayer cations is therefore known as the cation exchange capacity (CEC), and is represented by milliequivalents (meq) per 100 g of clay. The CEC differs depending on the clay, but Clay Handbook, 2nd Edition (edited by Nihon Clay Institute, published by Gihodo Publishing, KK.) gives the following values: kaolinite: 3–15 meq/100 g, halloysite: 5–40 meg/100 g, montmorillonite: 80–150 meq/100 g, illite: 10–40 meq/100 g, vermiculite: 100–150 meq/100 g, chlorite: 10–40 meq/100 g, sepiolite/attapulgite: 20–30 meq/100 g.

The clay mineral (b-1) used according to the present invention is a clay mineral whose surface is covered with a negative charge and is capable of cation exchange. Specific examples include, but are not limited to, kaolin minerals such as kaolinite, dickite and halloysite; smectites such as montmorillonite, hectorite, beidellite, saponite, teniolite and sauconite; micas such as white mica, palagonite and illite; vermiculites, brittle micas such as margarite and clintonite; chlorites such as donvasite, cookeite and clinochlore; sepiolite, palygorskite, etc. These clay minerals are naturally occurring, but their low impurity forms may also be obtained by artificial synthesis. According to the invention, these clay minerals may be used in their naturally occurring form or in artificial synthetic form.

The modified clay mineral (b) which is a constituent of the catalyst for olefin polymerization of the invention is prepared by modifying the mineral clay (b-1) with a proton acid salt of an amine compound (b-2) represented by the following general formula (1) or (2) or a proton acid salt of an amine compound (b-3) represented by the following general formula (3).

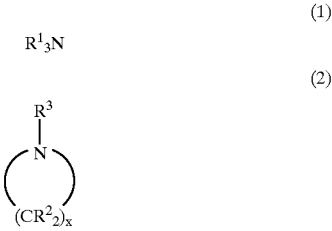

wherein $R^1$ represents a hydrogen atom or an alkyl group of 1–20 carbon atoms such as methyl, ethyl, propyl, isopropyl, isobutyl, n-butyl, s-butyl, t-butyl, pentyl, hexyl, heptyl, octyl, nonyl, decyl, dodecyl, hexadecyl, octadecyl or cyclohexyl, an alkenyl of 2–20 carbon atoms such as vinyl, propenyl, oleyl or cyclohexenyl, or an aralkyl group of 7–20 carbon atoms such as benzyl or phenylethyl, each of which may be the same or different provided that at least one $R^1$ is a hydrocarbon group of 6 or more carbon atoms such as hexyl, cyclohexyl, cyclohexenyl, heptyl, benzyl, octyl, phenylethyl, nonyl, decyl, dodecyl, hexadecyl, octadecyl or oleyl; $R^2$ and $R^3$ may be the same or different and each represents a hydrogen atom or a hydrocarbon group of 1–20 carbon atoms as mentioned above for $R^1$, and x is 4 or 5.

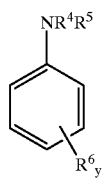

(3)

wherein $R^4$ and $R^5$ each represent a hydrogen atom or a hydrocarbon group of 1–20 carbon atoms, and each may be the same or different, $R^6$ represents a hydrocarbon, oxygen-containing hydrocarbon or nitrogen-containing hydrocarbon group of 1–20 carbon atoms, a silicon-containing hydrocarbon group of 3–20 carbon atoms or a halogen atom, and each may be the same or different, and specifically there may be mentioned hydrocarbon groups of 1–20 carbon atoms including alkyl groups such as methyl, ethyl, propyl, butyl, pentyl, hexyl, heptyl, octyl, nonyl, decyl, dodecyl, isopropyl, isobutyl, s-butyl, t-butyl and cyclohexyl, alkenyl groups such as vinyl, propenyl and cyclohexenyl, aryl groups such as phenyl, methylphenyl, ethylphenyl, biphenyl and naphthyl, and arylalkyl groups such as benzyl and phenylethyl; oxygen-containing hydrocarbon groups of 1–20 carbon atoms including alkoxyalkyl groups such as methoxymethyl, alkoxy groups such as methoxy and ethoxy, aryloxy groups such as phenoxy and methylphenoxy, arylalkoxy groups such as phenylmethoxy and phenylethoxy, and acyl groups such as acetyl and benzoyl; nitrogen-containing hydrocarbon groups of 1–20 carbon atoms including amino groups such as methylamino, dimethylamino, diethylamino and dipropylamino, aminoalkyl groups such as dimethylaminopropyl, and aminoaryl groups such as dimethylaminophenyl; silicon-containing hydrocarbon groups of 3–20 carbon atoms including alkylsilyl groups such as trimethylsilyl and triethylsilyl, arylsilyl groups such as phenyldimethylsilyl and diphenylmethylsilyl, and alkenylsilyl groups such as allyldimethylsilyl; and halogen atoms such as fluorine, chlorine, bromine and iodine, or the 2 $R^6$ groups may together form a ring, and y is 1 or 2.

Specific amine compounds represented by general formula (1) include, but are not limited to, aliphatic primary amines such as hexylamine, 2-aminoheptane, 3-aminoheptane, heptylamine, 1,5-dimethylhexylamine, 1-methylheptylamine, octylamine, t-octylamine, nonylamine, decylamine, undecylamine, dodecylamine, tridecylamine, 1-tetradecylamine, pentadecylamine, 1-hexadecylamine, octadecylamine, oleylamine, cyclohexylamine, cyclohepthylamine, cyclohexanemethylamine, 2-methylcyclohexylamine, 4-methylcyclohexylamine, 2,3-dimethylcyclohexylamine, cyclodedecylamine, 2-( 1-cyclohexenyl) ethylamine and geranylamine; aliphatic secondary amines such as N-methylhexylamine, dihexylamine, bis(2-ethylhexyl) amine, dioctylamine, didecylamine, didodecylamine, ditetradecylamine, dihexadecylamine, dioctadecylamine, dioleylamine, N-methylcyclohexylamine, N-ethylcyclohexylamine, N-isopropylcyclohexylamine, N-t-butylcyclohexylamine and N-allylcyclohexylamine; and aliphatic tertiary amines such as N,N-dimethyloctylamine, N,N-dimethylundecylamine, N,N-dimethyldodecylamine, N,N-dimethyltetradecylamine, N,N-dimethylhaxadecylamine, N,N-dimethyloctadecylamine, N,N-dioctylmethylamine, N,N-diundecylmethylamine, N,N-didodecylmethylamine, N,N-ditetradecylmethylamine, N,N-dihexadecylmethylamine, N,N-dioctadecylmethylamine, N,N-dioleylmethylamine, trihexylamine, triisooctylamine, trioctylamine, triisodecylamine, tridodecylamine, N-methyl-N-octadecyl-1-octadecaneamine, N,N-dimethylcyclohexylamine, N,N-dimethylcyclohexanemethylamine and N,N-diethylcyclohexylamine.

Specific examples of amine compounds represented by general formula (2) include, but are not limited to, pyrrolidine, piperidine, 2,5-dimethylpyrrolidine, 2-methylpiperidine, 3-methylpiperidine, 4-methylpiperidine, 2,6-dimethylpiperidine, 3,3-dimethylpiperidine, 3,5-dimethylpiperidine, 2-ethylpiperidine, 2,2,6,6-tetramethylpiperidine, 1-methylpyrrolidine, 1-methylpiperidine, 1-ethylpiperidine, 1-butylpyrrolidine and 1,2,2,6,6-pentamethylpiperidine.

Specific examples of amine compounds represented by general formula (3) include, but are not limited to, o-toluidine, m-toluidine, p-toluidine, 2,3-dimethylaniline, 2,4-dimethylaniline, 2,5-dimethylaniline, 2,6-dimethylaniline, 3,4-dimethylaniline, 3,5-dimethylaniline, 2-ethylaniline, 3-ethylaniline, 4-ethylaniline, 6-ethyl-o-toluidine, 2-isopropylaniline, 4-isopropylaniline, 2-t-butylaniline, 4-butylaniline, 4-s-butylaniline, 4-t-butylaniline, 2,6-diethylaniline, 2-isopropyl-6-methylaniline, 2-chloroaniline, 3-chloroaniline, 4-chloroaniline, 2-bromoaniline, 3-bromoaniline, 4-bromoaniline, o-anisidine, m-anisidine, p-anisidine, o-phenetidine, m-phenetidine, p-phenetidine, 1-aminonaphthalene, 2-aminonaphthalene, 1-aminofluorene, 2-aminofluorene, 3-aminofluorene, 4-aminofluorene, 5-aminoindane, 2-aminobiphenyl, 4-aminobiphenyl, N-methyl-o-toluidine, N-methyl-m-toluidine, N-methyl-p-toluidine, N-ethyl-o-toluidine, N-ethyl-m-toluidine, N-ethyl-p-toluidine, N-allyl-o-toluidine, N-allyl-m-toluidine, N-allyl-p-toluidine, N-propyl-o-toluidine, N-propyl-m-toluidine, N-propyl-p-toluidine, N,2,3-trimethylaniline, N,2,4-trimethylaniline, N,2,5-trimethylaniline, N,2,6-trimethylaniline, N,3,4-trimethylaniline, N,3,5-trimethylaniline, N-methyl-2-ethylaniline, N-methyl-3-ethylaniline, N-methyl-4-ethylaniline, N-methyl-6-ethyl-o-toluidine, N-methyl-2-isopropylaniline, N-methyl-4-isopropylaniline, N-methyl-2-t-butylaniline, N-methyl-4-butylaniline, N-methyl-4-s-butylaniline, N-methyl-4-t-butylaniline, N-methyl-2,6-diethylaniline, N-methyl-2-isopropyl-6-methylaniline, N-methyl-p-anisidine, N-ethyl-2,3-anisidine, N,N-dimethyl-o-toluidine, N,N-dimethyl-m-toluidine, N,N-dimethyl-p-toluidine, N,N,2,3-tetramethylaniline, N,N,2,4-tetramethylaniline, N,N,2,5-tetramethylaniline, N,N,2,6-tetramethylaniline, N,N,3,4-tetramethylaniline, N,N,3,5-tetramethylaniline, N,N-dimethyl-2-ethylaniline, N,N-dimethyl-3-ethylaniline, N,N-dimethyl-4-ethylaniline, N,N-dimethyl-6-ethyl-o-toluidine, N,N-dimethyl-2-isopropylaniline, N,N-dimethyl-4-isopropylaniline, N,N-dimethyl-2-t-butylanilinet N,N-dimethyl-4-butylaniline, N,N-dimethyl-4-s-butylaniline, N,N-dimethyl-4-t-butylaniline, N,N-dimethyl-2,6-diethylaniline, N,N-dimethyl-2-isopropyl-6-methylaniline, N,N-dimethyl-2-chloroaniline, N,N-dimethyl-3-chloroaniline, N,N- dimethyl-4-chloroaniline, N,N-dimethyl-2-bromoaniline, N,N-dimethyl-3-bromoaniline, N,N-dimethyl-4-bromoaniline, N,N-dimethyl-o-anisidine, N,N-dimethyl-m-anisidine, N,N-dimethyl-p-anisidine, N,N-dimethyl-o-phenetidine, N,N-dimethyl-m-phenetidine, N,N-dimethyl-p-phenetidine, N,N-dimethyl-1-aminonaphthalene, N,N-dimethyl-2-aminonaphthalene, N,N-dimethyl-1-aminofluorene, N,N-dimethyl-2-aminofluorene, N,N-dimethyl-3-aminofluorene, N,N-dimethyl-4-aminofluorene, N,N-dimethyl-5-aminoindane, N,N-dimethyl-2-aminobiphenyl, N,N-dimethyl-4-aminobiphenyl and N,N-dimethyl-p-trimethylsilylaniline.

The aforementioned amine compound (b-2) or (b-3) is reacted with the clay mineral (b-1) as a proton acid salt obtained by reaction of the amine with a proton acid, and examples of proton acids which may be used for the proton acid salt include, but are not limited to, hydrochloric acid, hydrofluoric acid, hydrobromic acid, hydroiodic acid and sulfuric acid.

The proton acid salt of the amine compound (b-2) or (b-3) which is reacted with the clay mineral (b-1) may be an isolated one obtained by reacting the proton acid with the amine compound (b-2) or (b-3) in advance, or it may be produced in the reaction solvent during the reaction with the clay mineral (b-1).

Specific examples of proton acid salts of the amine compound (b-2) to be used in isolated form include, but are not limited to, amine hydrochlorides such as hexylamine hydrochloride, 2-aminoheptane hydrochloride, 3-aminoheptane hydrochloride, heptylamine hydrochloride, 1,5-dimethylhexylamine hydrochloride, 1-methylheptylamine hydrochloride, octylamine hydrochloride, t-octylamine hydrochloride, nonylamine hydrochloride, decylamine hydrochloride, undecylamine hydrochloride, dodecylamine hydrochloride, tridecylamine hydrochloride, 1-tetradecylamine hydrochloride, pentadecylamine hydrochloride, 1-hexadecylamine hydrochloride, octadecylamine hydrochloride, oleylamine hydrochloride, cyclohexylamine hydrochloride, cyclobutylamine hydrochloride, cyclohexanemethylamine hydrochloride, 2-methylcyclohexylamine hydrochloride, 4-methylcyclohexylamine hydrochloride, 2,3-dimethylcyclohexylamine hydrochloride, cyclododecylamine hydrochloride, 2-(1-cyclohexenyl)ethylamine hydrochloride, geranylamine hydrochloride, N-methylhexylamine hydrochloride, dihexylamine hydrochloride, bis(2-ethylhexyl)amine hydrochloride, dioctylamine hydrochloride, didecylamine hydrochloride, didodecylamine hydrochloride, ditetradecylamine hydrochloride, dihexadecylamine hydrochloride, dioctadecylamine hydrochloride, dioleylamine hydrochloride, N-methylcyclohexylamine hydrochloride, N-ethylcyclohexylamine hydrochloride, N-isopropylcyclohexylamine hydrochloride, N-t-butylcyclohexylamine hydrochloride, N-allylcyclohexylamine hydrochloride, N,N-dimethyloctylamine hydrochloride, N,N-dimethylundecylamine hydrochloride, N,N-dimethyldodecylamine hydrochloride, N,N-dimethyltetradecylamine hydrochloride, N,N-dimethylhaxadecyl amine hydrochloride, N,N-dimethyloctadecylamine hydrochloride, N,N-dioctylmethylamine hydrochloride, N,N-diundecylmethylamine hydrochloride, N,N-didodecylmethylamine hydrochloride, N,N-ditetradecylmethylamine hydrochloride, N,N-dihexadecylmethylamine hydrochloride, N,N-dioctadecylmethylamine hydrochloride, N,N-dioleylmethylamine hydrochloride, trihexylamine hydrochloride, trisooctylamine hydrochloride, trioctylamine hydrochloride, trhsodecylamine hydrochloride, tridodecylamine hydrochloride, N-methyl-N-octadecyl-1-octadecaneamine hydrochloride, N,N-dimethylcyclohexylamine hydrochloride, N,N-dimethylcyclohexanemethylamine hydrochloride, N,N-diethylcyclohexylamine hydrochloride, pyrrolidine hydrochloride, piperidine hydrochloride, 2,5-dimethylpyrrolidine hydrochloride, 2-methylpiperidine hydrochloride, 3-methylpiperidine hydrochloride, 4-methylpiperidine hydrochloride, 2,6-dimethylpiperidine hydrochloride, 3,3-dimethylpiperidine hydrochloride, 3,5-dimethylpiperidine hydrochloride, 2-ethylpiperidine hydrochloride, 2,2,6,6-tetramethylpiperidine hydrochloride, 1-methylpyrrolidine hydrochloride, 1-methylpiperidine hydrochloride, 1-ethylpiperidine hydrochloride, 1-butylpyrrolidine hydrochloride and 1,2,2,6,6-pentamethylpiperidine hydrochloride, or these hydrochlorides which have been converted to other proton acid salts such as hydrofluoric acid salts, hydrobromic acid salts, hydroiodic acid salts, acetic acid salts or sulfuric acid salts.

Examples of proton acid salts of the amine compound (b-3) to be used in isolated form, specifically with regard to hydrochlorides, include but are not limited to o-toluidine hydrochloride, m-toluidine hydrochloride, p-toluidine hydrochloride, 2,3-dimethylaniline hydrochloride, 2,4-dimethylaniline hydrochloride, 2,5-dimethylaniline hydrochloride, 2,6-dimethylaniline hydrochloride, 3,4-dimethylaniline hydrochloride, 3,5-dimethylaniline hydrochloride, 2-ethylaniline hydrochloride, 3-ethylaniline hydrochloride, 4-ethylaniline hydrochloride, 6-ethyl-o-toluidine hydrochloride, 2-isopropylaniline hydrochloride, 4-isopropylaniline hydrochloride, 2-t-butylaniline hydrochloride, 4-butylaniline hydrochloride, 4-s-butylaniline hydrochloride, 4-t-butylaniline hydrochloride, 2,6-diethylaniline hydrochloride, 2-isopropyl-6-methylaniline hydrochloride, 2-chloroaniline hydrochloride, 3-chloroaniline hydrochloride, 4-chloroaniline hydrochloride, 2-bromoaniline hydrochloride, 3-bromoaniline hydrochloride, 4-bromoaniline hydrochloride, o-anisidine hydrochloride, m-anisidine hydrochloride, p-anisidine hydrochloride, o-phenetidine hydrochloride, m-phenetidine hydrochloride, p-phenetidine hydrochloride, 1-aminonaphthalene hydrochloride, 2-aminonaphthalene hydrochloride, 1-aminofluorene hydrochloride, 2-aminofluorene hydrochloride, 3-aminofluorene hydrochloride, 4-aminofluorene hydrochloride, 5-aminoindane hydrochloride, 2-aminobiphenyl hydrochloride, 4-aminobiphenyl hydrochloride, N-methyl-o-toluidine hydrochloride, N-methyl-m-toluidine hydrochloride, N-methyl-p-toluidine hydrochloride, N-ethyl-o-toluidine hydrochloride, N-ethyl-m-toluidine hydrochloride, N-ethyl-p-toluidine hydrochloride, N-allyl-o-toluidine hydrochloride, N-allyl-m-toluidine hydrochloride, N-allyl-p-toluidine hydrochloride, N-propyl-o-toluidine hydrochloride, N-propyl-m-toluidine hydrochloride, N-propyl-p-toluidine hydrochloride, N,2,3-trimethylaniline hydrochloride, N,2,4-trimethylaniline hydrochloride, N,2,5-trimethylaniline hydrochloride, N,2,6-trimethylaniline hydrochloride, N,3,4-trimethylaniline hydrochloride, N,3,5-trimethylaniline hydrochloride, N-methyl-2-ethylaniline hydrochloride, N-methyl-3-ethylaniline hydrochloride, N-methyl-4-ethylaniline hydrochloride, N-methyl-6-ethyl-o-toluidine hydrochloride, N-methyl-2-isopropylaniline hydrochloride, N-methyl-4-isopropylaniline hydrochloride, N-methyl-2-t-butylaniline hydrochloride, N-methyl-4-butylaniline hydrochloride, N-methyl-4-s-butylaniline hydrochloride, N-methyl-4-t-butylaniline hydrochloride, N-methyl-2,6-diethylaniline hydrochloride, N-methyl-2-isopropyl-6-methylaniline hydrochloride, N-methyl-p-anisidine hydrochloride, N-ethyl-2,3-anisidine hydrochloride, N,N-dimethyl-o-toluidine hydrochloride, N,N-dimethyl-m-toluidine hydrochloride, N,N-dimethyl-p-toluidine hydrochloride, N,N,2,3-tetramethylaniline hydrochloride, N,N,2,4-tetramethylaniline hydrochloride, N,N,2,5-tetramethylaniline hydrochloride, N,N,2,6-tetramethylaniline hydrochloride, N,N, 3,4-tetramethylaniline hydrochloride, N,N,3,5-tetramethylaniline hydrochloride, N,N-dimethyl-2-ethylaniline hydrochloride, N,N-dimethyl-3-ethylaniline hydrochloride, N,N-dimethyl-4-ethylaniline hydrochloride, N,N-dimethyl-6-ethyl-o-toluidine hydrochloride, N,N-dimethyl-2-isopropylaniline hydrochloride, N,N-dimethyl-4-isopropylaniline hydrochloride, N,N-dimethyl-2-t-butylaniline hydrochloride, N,N-dimethyl-4-butylaniline hydrochloride, N,N-dimethyl-4-s-butylaniline hydrochloride, N,N-dimethyl-4-t-butylaniline hydrochloride, N,N-dimethyl-2,6-diethylaniline hydrochloride, N,N-dimethyl-2-isopropyl-6-methylaniline hydrochloride, N,N-dimethyl-2-chloroaniline hydrochloride, N,N-dimethyl-3-chloroaniline hydrochloride, N,N-dimethyl-4-chloroaniline hydrochloride, N,N-dimethyl-2-bromoaniline hydrochloride, N,N-dimethyl-3-bromoaniline hydrochloride, N,N-dimethyl-4-bromoaniline hydrochloride, N,N-dimethyl-o-anisidine hydrochloride, N,N-dimethyl-m-anidisine hydrochloride, N,N-dimethyl-p-anisidine hydrochloride, N,N-dimethyl-o-phenetidine hydrochloride, N,N-dimethyl-m-phenetidine hydrochloride, N,N-dimethyl-p-phenetidine hydrochloride, N,N-dimethyl-1-aminonaphthalene hydrochloride, N,N-dimethyl-2-aminonaphthalene hydrochloride, N,N-dimethyl-1-aminofluorene hydrochloride, N,N-dimethyl-2-aminofluorene hydrochloride, N,N-dimethyl-3-aminofluorene hydrochloride, N,N-dimethyl-4-aminofluorene hydrochloride, N,N-dimethyl-5-aminoindane hydrochloride, N,N-dimethyl-2-aminobiphenyl hydrochloride, N,N-dimethyl-4-aminobiphenyl hydrochloride, N,N-dimethyl-p-trimethylsilylaniline hydrochloride, or these hydrochlorides which have been converted to other proton acid salts.

A constituent of the catalyst for olefin polymerization according to the invention is a modified clay compound (b) which is the above-mentioned clay mineral (b-1) modified with a proton acid salt of an amine compound (b-2) having a specific structure. Here, modification means that an exchangeable cation of the metal ions present in the clay mineral (b-1) is exchanged with the ammonium cation component of the proton acid salt of the amine compound (b-2), and the modified clay compound is the resulting clay mineral/organic ion complex. There are no particular restrictions on the reaction conditions for (b-1) and the proton acid salt of (b-2) for the modification or on the reaction weight ratio between (b-1) and the proton acid salt of (b-2), but the proton acid salt of (b-2) is preferably reacted in an amount of at least 0.5 equivalent with respect to the cation in (b-1), and more preferably at least one equivalent for higher activity of the catalyst. The aforementioned clay mineral (b-1) may be a single one used alone or a mixture of different types, while the proton acid salt of the amine compound (b-2) may also be a single one used alone or a mixture of different types. Also, the reaction solvent used may be water or a polar organic solvent, and specifically an alcohol such as methyl alcohol or ethyl alcohol, or acetone, tetrahydrofuran, N,N-dimethylformamide, dimethylsulfoxide, methylene chloride, etc., which solvents may be used either alone or as mixed solvents. The use of water or an alcohol is particularly preferred.

Alternatively, a constituent of the catalyst for olefin polymerization according to the invention is a modified clay compound (b) which is the above-mentioned clay mineral (b-1) modified with a proton acid salt of the amine compound (b-3). There are no particular restrictions on the reaction conditions for (b-1) and the proton acid salt of (b-3) or on the reaction weight ratio between (b-1) and the proton acid salt of (b-3), but the proton acid salt of (b-3) is preferably reacted in an amount of at least one equivalent with respect to the cation in (b-1). The aforementioned clay mineral (b-1) may be a single one used alone or a mixture of different types, while the proton acid salt of the amine compound (b-3) may also be a single one used alone or a mixture of different types. Also, the reaction solvent used may be water or a polar organic solvent, and specifically an alcohol such as methyl alcohol or ethyl alcohol, or acetone, tetrahydrofuran, N,N-dimethylformamide, dimethylsulfoxide, methylene chloride, etc., which solvents may be used either alone or as mixed solvents. The use of water or an alcohol is particularly preferred.

The modified clay compound (b) which is the aforementioned clay mineral (b-1) modified with a proton acid salt of the amine compound (b-3) has particularly excellent storage stability.

The organic aluminum compound (c) used according to the invention is represented by the following general formula (30).

$$AlR^{22}_3 \qquad (30)$$

wherein each $R^{22}$ independently represents a hydrogen atom, a halogen atom or an amino, alkyl, alkoxy or aryl group, and at least one $R^{22}$ is an alkyl group.

Specific examples thereof include, but are not limited to, trialkylaluminum compounds such as trimethylaluminum, triethylaluminum, tri(normal-propyl)aluminum, tri (isopropyl)aluminum, tri(normal-butyl)aluminum, tri (isobutyl)aluminum, tri(t-butyl)aluminum and triamylaluminum; dialkylaluminum hydrides such as diisobutylaluminum hydride; dialkylaluminum halides such as dimethylaluminum chloride, diethylaluminum chloride, diisobutylaluminum chloride, di(t-butyl)aluminum chloride and diamylaluminum chloride; alkylaluminum dihalides such as methylaluminum dichlorides, ethylaluminum dichloride, isobutylaluminum dichloride, t-butylaluminum dichloride and amylaluminum dichloride; and dialkylaluminum alkoxides such as diethylaluminum ethoxide. Trialkylaluminum is preferred among these.

The 3 components described above, the transition metal compound (a), modified clay compound (b) and organic aluminum compound (c), are contacted to produce the catalyst for olefin polymerization, and although the addition method or addition procedure for the catalyst constituents is not critical, examples of possible addition procedures are presented below.

(1) The organic aluminum compound (c) is added after contacting the transition metal compound (a) with the modified clay compound (b).

(2) The transition metal compound (a) is added after contacting the modified clay compound (b) with the organic aluminum compound (c).

(3) A contacted mixture of the transition metal compound (a) and the organic aluminum compound (c) is added after contacting the modified clay compound (b) with the organic aluminum compound (c).

(4) The 3 components are contacted simultaneously.

Of these procedures, the methods of (2) and (3) wherein all or a portion of the modified clay compound (b) and the organic aluminum compound (c) are contacted beforehand are particularly preferred from the standpoint of better reproducibility, because they minimize the effect of impurities in the clay mineral.

The above-mentioned 3 components are contacted in a solvent which is inert to the components, under an inert gas atmosphere. Specific examples of such solvents include aliphatic hydrocarbons such as butane, pentane, hexane, heptane, octane, nonane, decane, tetradecane, cyclopentane and cyclohexane, and aromatic hydrocarbons such as benzene, toluene and xylene. In addition to these organic solvents, chloroform, methylene chloride, chlorobenzene and other halogen-containing compounds may also be used. The contacting temperature may be in a range from −50° C. to the boiling point of the solvent. The temperature is preferably at least room temperature.

The amount of the modified clay compound (b) with respect to the transition metal compound (a) in the catalyst system is not critical so long as the amount of the modified clay compound (b) is sufficient for reaction of the transition metal compound (a), but the cation is preferably present in the modified clay compound (b) in a 1- to 10,000-fold molar amount with respect to the transition metal compound (a). At less than an equimolar amount it is impossible to achieve sufficient activity, while at greater than a 10,000-fold molar amount the activity per catalyst component is lower, creating the need for removal of ash in the polymer. Also, the amount of the organic aluminum compound (c) is not critical, but is preferably no greater than a 10,000-fold molar amount with respect to the transition metal compound (a), because when this amount is exceeded it becomes necessary to consider an ash removal step. Considering the aspects of stability of the catalyst and eliminating catalyst poisons, the organic aluminum compound (c) is preferably used in a range of a 1- to 10,000-fold molar amount.

When using a transition metal compound (a) according to the invention as a catalyst component, 2 or more types of transition metal compounds may be used for the polymerization.

The olefin polymerization catalyst according to the present invention may be used for any common olefin polymerization process, i.e. slurry polymerization, gas phase polymerization, high pressure polymerization, solution polymerization or bulk polymerization. The solvent used for the polymerization may be any generally used organic solvent, among which there may be mentioned specifically benzene, toluene, xylene, butane, pentane, hexane, heptane, cyclohexane and methylene chloride, while the olefin itself may also be used as a solvent in the case of polymerization of propylene, 1-butene, 1-octene, 1-hexene or the like.

Examples of the olefin provided for polymerization according to the present invention may include α-olefins of 2–20 carbon atoms, diene compounds and cyclic olefins, and the polymerization may be accomplished by either homopolymerization using one of these or copolymerization using two or more.

The α-olefins may include ethylene, propylene, 1-butene, 1-pentene, 4-methyl-1-pentene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene or styrene, but are not limited to these.

The diene compounds may include aliphatic non-conjugated polyenes such as 1,4-hexadiene, 1,5-hexadiene, 3-methyl-1, 4-hexadiene, 4-methyl-1, 4-hexadiene, 5-methyl-1,4-hexadiene, 4-ethyl-1,4-hexadiene, 3-methyl-1, 5-hexadiene, 3,3-dimethyl-1,4-hexadiene, 5-methyl-1,4-heptadiene, 5-methyl-1,5-heptadiene, 5-ethyl-1,4-heptadiene, 6-methyl-1,5-heptadiene, 5-ethyl-1,5-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1, 4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 1,9-decadiene, 5-methyl-1,4-decadiene, 5-ethyl-1,4-decadiene, 5-methyl-1,5-decadiene, 6-methyl-1, 5-decadiene, 5-ethyl-1,5-decadiene, 6-ethyl-1,5-decadiene, 6-methyl-1,6-decadiene, 6-ethyl-1,6-decadiene, 7-methyl-1, 6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1, 8-decadiene, 8-ethyl-1,8-decadiene, 6-methyl-1,6-undecadiene and 9-methyl-1,8-undecadiene; conjugated polyenes such as butadiene and isoprene; and aliphatic polyenens such as dicyclopentadiene, 5-ethylidene-2-norbornene, 5-isopropylidene-2-norbornene, 6-chloromethyl-5-isopropenyl-2-norbornene, 2,3-diisopropylidene-5-norbornene and 2-ethylidene-3-isopropylidene-5-norbornene, but they are not limited to these.

Further, the above-mentioned cyclic olefins may include monocyclic olefins such as cyclobutene, cyclopentene, cyclohexene, cycloheptene and cyclooctene; substituted monocyclic olefins such as 3-methylcyclopentene and 3-methylcyclohexene; polycyclic olefins such as norbornene, 1,2-dihydrodicyclopentadiene and 1,4,5,8-dimethano-1,2,3,4,4a,5,8,8a-octahydronaphthalene; and substituted polycyclic olefins such as 1-methylnorbornene, 5-methylnorbornene, 5-ethylnorbornene, 5-propylnorbornene, 5-phenylnorbornene, 5-benzylnorbornene, 7-methylnorbornene, 5,6-dimethylnorbornene and 2-methyl-1,4,5,8-dimethano-1,2,3, 4,4a,5,8,8a-octahydronaphthalene, but they are not limited to these.

There are no particular restrictions on the polymerization conditions for production of polyolefins by the method of the invention, such as the polymerization temperature, polymerization time, polymerization pressure, monomer concentration, etc., but preferably the polymerization temperature is from −100 to 300° C., the polymerization time is 10 seconds to 20 hours and the polymerization pressure is preferably from normal pressure to 3500 kg/cm$^2$. Hydrogen or the like may also be used to adjust the molecular weight during polymerization. The polymerization may be carried out in a batch system, semi-continuous system or continuous system, and it may be carried out in 2 or more stages under different polymerization conditions. The polyolefin resulting upon the completion of polymerization may be obtained by isolation and recovery from the solvent and drying, according to conventionally known methods.

The present invention will now be illustrated in more detail by way of the following examples, which incidentally are not intended to restrict the invention in any way.

The polymerization procedure, reaction and solvent purification were all carried out under an inert gas atmosphere. Also, the solvents etc. used for the reactions were all purified, dried and deoxidized beforehand by publicly known methods. The compounds used for the reactions were also synthesized and identified by publicly known methods.

The MFR (Melt Flow Rate) of each of the olefin polymers obtained according to the invention was measured according to ASTM D1238, condition E.

To determine the melting points of the olefin polymers, a sample kept at 200° C. for 5 minutes was cooled to 0° C. and then heated by 10° C./min, and the crystal melt peak was measured using a DSC (DSC200, product of SEIKO Co.).

The deactivation rate constant is given as an index of the polymerization behavior during solution polymerization. The polymerization reaction gradually undergoes deactivation after the maximum flow rate of the monomer in the initial stage of the reaction. The change in deactivation with time approximates a straight line when ethylene flow rate (Nl/min) is plotted against polymerization time (min) on the logarithmic scale of a semi-logarithmic graph. This regression line is represented by the following exponential function.

$$f(t)=Ae^{(-kt)}$$

where f(t) is the ethylene flow rate (Nl/min), k is the deactivation rate constant, t is the polymerization time (min) and A is a segment of the deactivation line.

A smaller deactivation rate constant indicates a catalyst undergoing less degradation with time.

The degradation with time was plotted within the range of a given polymerization time or until deactivation to ¼ of the flow rate from the point of maximum flow rate, to determine the deactivation rate constant. The correlation coefficient for the regression line obtained by plotting under these conditions was 0.97 or greater.

The indexes used to indicate the initial activity during polymerization were the ratio of the ethylene integrated flow at one minute after the start of polymerization to the ethylene integrated flow at the end of polymerization (10 minutes) (A1/A10; %) and the ratio of the ethylene integrated flow at two minutes after the start of polymerization to the ethylene integrated flow at the end of polymerization (10 minutes) (A2/A10; %). For high pressure processes wherein the polymerization is conducted in a short time under high pressure, high temperature conditions, it is preferred for the catalyst system to have a high initial activity and a rapid deactivation rate. That is, the most suitable catalysts for such processes are those which have higher activity and higher values for the aforementioned ratios A1/A10 and A2/A10.

EXAMPLE 1

[Preparation of Modified Clay Compound]

After suspending dodecylamine (4.17 g, 22.5 mmol) in 150 ml of adequately degasified water in a 300 ml flask, 1.8 ml of hydrochloric acid (12 N) was added and the mixture was stirred at room temperature for 2 hours to make a uniform solution. This was then added, with stirring, to a suspension prepared by dispersing 9.5 g of high purity montmorillonite (tradename: Kunipia, product of Kunimine Industries; ion exchange capacity: 115.0 meq/100 g) in 1 liter of adequately degasified water in a 2 liter flask, and the mixture was stirred for 24 hours thereafter. After filtering the mixture, it was washed with water and ethanol and dried under reduced pressure at room temperature to obtain a modified clay compound.

[Preparation of Catalyst Suspension]

After suspending 1.0 g of the modified clay compound obtained above in 56 ml of toluene in a 300 ml Schlenk's flask, 2.8 ml of a triethylaluminum solution (1.44 mol/l, toluene solvent) was added thereto and the mixture was stirred for one hour. Separately, a solution of 22.3 mg (40.0 μmol) of diphenylmethylene(cyclopentadienyl)(fluorenyl)zirconium dichloride, 24 ml of toluene and 5.6 ml of a triethylaluminum solution (1.44 mol/l, toluene solvent) was prepared in a 50 ml Schlenk's flask, and added to the above modified clay compound suspension and stirred for 12 hours to obtain a catalyst suspension.

[Solution Polymerization]

After nitrogen purging of a 1 liter autoclave, 600 ml of a $C_9$–$C_{13}$ saturated hydrocarbon solvent (IP Solvent 1620, product of Idemitsu Petroleum Chemical Co.) and 20 ml of 1-hexene were added thereto, the internal pressure of the autoclave was adjusted to 21 kgf/cm$^2$ with ethylene and the temperature of the autoclave was set to 170° C. Next, 12 ml of decane containing 1.1 ml (0.5 μmol in terms of Zr) of the catalyst suspension synthesized by the method described above was added to the autoclave, and polymerization was conducted for 10 minutes. After completion of the polymerization reaction, the unreacted ethylene was removed and ethanol was poured into the reaction solution to obtain 48.0 g of polymer. The properties of the resulting polymer are shown in Table 1. The deactivation rate constant k for the polymer was 0.20 min$^{-1}$.

EXAMPLE 2

A modified clay compound was prepared by the same method as Example 1 except that 2.26 g (22.8 mmol) of N-methylpiperidine was used instead of dodecylamine for preparation of the modified clay compound.

Preparation of the catalyst suspension and polymerization were carried out by the same method in Example 1 except that the modified clay compound prepared here was used. The results are shown in Table 1.

EXAMPLE 3

A modified clay compound was prepared by the same method as Example 1 except that 3.18 g (22.5 mmol) of 2,2,6,6-tetramethylpiperidine was used instead of dodecylamine for preparation of the modified clay compound.

Preparation of the catalyst suspension and polymerization were carried out by the same method in Example 1 except that the modified clay compound prepared here was used. The results are shown in Table 1.

EXAMPLE 4

[Preparation of Modified Clay Compound]

After suspending 6.06 g (22.5 mmol) of octadecylamine in 150 ml of adequately degasified ethanol in a 300 ml flask, 1.8 ml of hydrochloric acid (12 N) was added and the mixture was stirred at room temperature for 2 hours to make a uniform solution. After then adding thereto, with stirring, 9.5 g of synthetic hectolite (tradename: Laponite, product of Nihon Silica Industries), the stirring was continued for 24 hours. After filtering the mixture, it was washed with water and ethanol and dried under reduced pressure at room temperature to obtain a modified clay compound.

Preparation of the catalyst suspension and polymerization were carried out by the same method in Example 1 except that the modified clay compound prepared here was used.

The results are shown in Table 1. No deactivation of the catalyst was observed in this system during the 10 minute polymerization time.

COMPARATIVE EXAMPLE 1
[Preparation of Modified Clay Compound]

A 3.6 (22.8 mmol) portion of N,N-dimethylaniline hydrochloride was dissolved in 150 ml of adequately degasified water in a 300 ml flask. After then adding thereto, with stirring, 9.5 g of high purity montmorillonite (tradename: Kunipia, product of Kunimine Industries; ion exchange capacity: 115.0 meq/100 g), the stirring was continued for 24 hours. After filtering the mixture, it was washed with water and ethanol and dried under reduced pressure at room temperature to obtain a modified clay compound.

Preparation of the catalyst suspension and polymerization were carried out by the same method in Example 1 except that the modified clay compound prepared here was used. The results are shown in Table 1.

COMPARATIVE EXAMPLE 2

A modified clay compound was prepared by the same method as Comparative Example 1 except that 3.3 g (22.8 mmol) of 2,6-dimethylpyridine hydrochloride was used instead of N,N-dimethylaniline hydrochloride for preparation of the modified clay compound.

Preparation of the catalyst suspension and polymerization were carried out by the same method in Example 1 except that the modified clay compound prepared here was used. The results are shown in Table 1.

COMPARATIVE EXAMPLE 3

A modified clay compound was prepared by the same method as Comparative Example 1 except that 2.6 g (22.8 mmol) of pyridine hydrochloride was used instead of N,N-dimethylaniline hydrochloride and synthetic hectolite (tradename: Laponite, product of Nihon Silica Industries) was used instead of high purity montmorillonite for preparation of the modified clay compound.

Preparation of the catalyst suspension and polymerization were carried out by the same method in Example 1 except that the modified clay compound prepared here was used. The results are shown in Table 1.

COMPARATIVE EXAMPLE 4

A modified clay compound was prepared by the same method as Comparative Example 1 except that 5.1 g (22.8 mmol) of tri-n-butylamine hydrochloride was used instead of N,N-dimethylaniline hydrochloride and synthetic hectolite (tradename: Laponite, product of Nihon Silica Industries) was used instead of high purity montmorillonite for preparation of the modified clay compound.

Preparation of the catalyst suspension and polymerization were carried out by the same method in Example 1 except that the modified clay compound prepared here was used. The results are shown in Table 1.

Examples 1–4 and Comparative Examples 1–4 given above demonstrate the distinctive effect of the present invention. In other words, they show that it is possible to produce olefin polymers with a high degree of productivity by using catalysts for olefin polymerization which comprise a transition metal compound (a), an organic aluminum compound (c) and a modified clay compound (b) which has been modified with a proton acid salt of an amine compound (b-2) having a specific structure. Also, the excellent activity duration of the catalysts even at high temperatures, as shown by the results given above, demonstrates that the catalysts are suitable for solution polymerization processes carried out at high temperatures and requiring extended residence times for catalysts.

TABLE 1

|  | Amine | Clay | Activity kg/mmol/Zr | MI g/10 min | Tm °C. | k (deactivation rate constant) min$^{-1}$ |
|---|---|---|---|---|---|---|
| Example 1 | dodecylamine | montmorillonite | 96.0 | 5.1 |  | 0.20 |
| Example 2 | N-methylpiperidine | montmorillonite | 93.2 | 11.1 |  | 0.15 |
| Example 3 | 2,2,6,6-tetramethylpiperidine | montmorillonite | 140.6 | 13.6 |  | 0.14 |
| Example 4 | octadecylamine | hectolite | 108.0 | 5.7 | 113 |  |
| Comp. Example 1 | N,N-dimethylaniline | montmorillonite | 95.6 | 19.6 | 112 | 0.44 |
| Comp. Example 2 | 2,6-dimethylpyridine | montmorillonite | 38.3 | 3.3 |  |  |
| Comp. Example 3 | pyridine | hectolite | 21.0 | 5.3 | 108 |  |
| Comp. Example 4 | tri-n-butylamine | hectolite | 56 | 2.2 | 116 |  |

Catalyst: Ph$_2$C(Cp) (Flu) ZrCl$_2$/Et$_3$Al/modified clay = 1 mmol/300 mmol/25 g toluene solution
Polymerization conditions
catalyst: 0.5 μmol Zr
600 ml IP solvent, 20 kg/cm$^2$G ethylene, 20 ml hexene
polymerization start temperature: 170° C.
polymerization time: 10 minutes

EXAMPLE 5
[Preparation of Modified Clay Compound]

After dissolving N,N-dimethyloctadecylamine (7.14 g, 24.0 mmol) in 100 ml of adequately degasified ethanol in a 300 ml flask, 2.0 ml of hydrochloric acid (12 N) was added and the mixture was stirred at room temperature for a half hour. The solution was added with 100 ml of water and then with 20 g of high purity montmorillonite (tradename: Kunipia, product of Kunimine Industries; ion exchange capacity: 115.0 meq/100 g), and the mixture was stirred for 12 hours. After filtering the mixture, the residue was washed with water and ethanol and dried at room temperature under reduced pressure to obtain a modified clay compound.

[Preparation of Catalyst Suspension]

After suspending 1.0 g of the modified clay compound obtained above in 56 ml of toluene in a 300 ml Schlenk's flask, 2.8 ml of a triisobutylaluminum solution (1.44 mol/l, toluene solvent) was added thereto and the mixture was stirred for one hour. Separately, a solution of 26.7 mg (40.0 μmol) of diphenylmethylene(cyclopentadienyl)(2,7-di-t-butyl-fluorenyl) zirconium dichloride, 24 ml of toluene and 5.6 ml of a triisobutylaluminum solution (1.44 mol/l, toluene solvent) was prepared in a 50 ml Schlenk's flask, and added to the above modified clay compound suspension and stirred for 12 hours to obtain a catalyst suspension.

[Polymerization]

After nitrogen purging of a 5 liter autoclave, 2250 ml of toluene and 250 ml of 1-hexene were added thereto and the temperature of the autoclave was set to 80° C. Further, ethylene was introduced to adjust the internal pressure of the autoclave to 4 kgf/cm². Then, 11 ml (5.0 μmol in terms of Zr) of the catalyst suspension prepared above was added to the autoclave, and polymerization was conducted for 10 minutes. After completion of the polymerization reaction, the unreacted ethylene was removed and the reaction solution was poured into ethanol to obtain 95.6 g of polymer. The results are shown in Table 2.

EXAMPLE 6

[Preparation of Modified Clay Compound]

After dissolving N,N-dimethyloctadecylamine (4.58 g, 15.4 mmol) in 100 ml of adequately degasified ethanol in a 300 ml flask, 1.3 ml of hydrochloric acid (12 N) was added and the mixture was stirred at room temperature for a half hour. The solution was added with 100 ml of water and then with 20 g of synthetic saponite (tradename: Smecton SA, product of Kunimine Industries; ion exchange capacity: 70 meq/100 g), and the mixture was stirred for 12 hours. After filtering the mixture, the residue was washed with water and ethanol and dried at room temperature under reduced pressure to obtain a modified clay compound.

Preparation of the catalyst suspension and polymerization were carried out by the same method in Example 5 except that the modified clay compound prepared here was added. The results are shown in Table 2.

EXAMPLE 7

After nitrogen purging of a 5 liter autoclave, 2250 ml of toluene, 250 ml of 1-hexene and 20 ml of 5-ethylidene-2-norbornene were added thereto and the temperature of the autoclave was set to 80° C. Further, ethylene was introduced to adjust the internal pressure of the autoclave to 4 kgf/cm². Then, 11 ml (5.0 μmol in terms of Zr) of the catalyst suspension prepared in Example 5 was added to the autoclave, and polymerization was conducted for 15 minutes. After completion of the polymerization reaction, the unreacted ethylene was removed and the reaction solution was poured into ethanol to obtain 99.8 g of polymer. The results are shown in Table 2.

COMPARATIVE EXAMPLE 5

Preparation of the catalyst suspension and polymerization were carried out by the same method in Example 5 except that unmodified high purity montmorillonite (tradename: Kunipia, product of Kunimine Industries; ion exchange capacity: 115.0 meq/100 g) was used as a clay compound. No polymer could be obtained.

COMPARATIVE EXAMPLE 6

Preparation of the catalyst suspension and polymerization were carried out by the same method in Example 5 except that the modified clay compound prepared in Comparative Example 1 was added. The results are shown in Table 2.

COMPARATIVE EXAMPLE 7

[Preparation of Modified Clay Compound]

After suspending 3.3 g of N,N-dimethylaniline (27.2 mmol) in 200 ml of adequately degasified water in a 300 ml flask, 2.3 ml of hydrochloric acid (12 N) was added and the mixture was stirred at room temperature for a half hour to obtain a uniform solution. The solution was then added with 20 g of synthetic saponite (tradename: Smecton SA, product of Kunimine Industries; ion exchange capacity: 70 meq/100 g), and the mixture was stirred for 12 hours. After filtering the mixture, the residue was washed with water and ethanol and dried at room temperature under reduced pressure to obtain a modified clay compound.

Preparation of the catalyst suspension and polymerization were carried out by the same method in Example 5 except that the modified clay compound prepared here was added. The results are shown in Table 2.

EXAMPLE 8

After nitrogen purging of a 5 liter autoclave, 1000 ml of toluene and 1000 ml of liquid propylene were added thereto and the temperature of the autoclave was set to 40° C. Then, 11 ml (5.0 μmol in terms of Zr) of the catalyst suspension prepared in Example 5 was added to the autoclave, and polymerization was conducted for 60 minutes. After completion of the polymerization reaction, the unreacted propylene was removed and the reaction solution was poured into ethanol to obtain 28.2 g of polypropylene. The obtained polypropylene had a racemic pentado of 80% and an MI of 0.6 g/10 minutes as measured at 230° C.

COMPARATIVE EXAMPLE 8

A catalyst suspension was prepared according to the procedures as in Example 5 by using the modified clay compound prepared in Comparative Example 1 and propylene polymerization was conducted according to the procedures as in Example 8. Thus, 12.0 g of polypropylene was obtained. The obtained polypropylene had a racemic pentado of 55% and an MI of 3.5 g/10 minutes as measured at 230° C.

Examples 5–8 and Comparative Examples 5–8 given above demonstrate the distinctive effect of the present invention. In otherwords, they show that it is possible to produce olefin polymers of a high molecular weight with a high degree of productivity by using catalysts for olefin polymerization which comprise a transition metal compound (a), an organic aluminum compound (c) and a modified clay compound (b) which has been modified with a proton acid salt of an amine having a specific structure. Also, the excellent activity duration of the catalyst even at high temperature, as shown by the results given above, demonstrates that the catalysts are suitable for solution polymerization processes carried out at high temperature and requiring extended residence times for catalysts.

TABLE 2

|  | Amine | Clay | Activity kg/mmolZr hr | Hexene content mol % | Iodine value | MI g/10 min |
|---|---|---|---|---|---|---|
| Example 5 | N,N-dimethyloctadecylamine | montmorillonite | 115 | 19 | — | 0.2 |
| Example 6 | N,N-dimethyloctadecylamine | saponite | 125 | 21 | — | 0.3 |
| Example 7 | N,N-dimethyloctadecylamine | montmorillonite | 80 | 22 | 16 | — |
| Comp Example 5 | — | montmorillonite | 0 | — | — | — |
| Comp. Example 6 | N,N-dimethylaniline | montmorillonite | 52 | 16 | — | 0.6 |
| Comp. Example 7 | N,N-dimethylaniline | saponite | 43 | 17 | — | 0.6 |

Polymerization conditions
catalyst: 5.0 μmol Zr transition metal compound/organic aluminum compound/modified clay = 1 mmol/300 mmol/25 g
polymerization temp.: 80° C. polymerization time: 10 minutes (Example 7: 15 minutes)
Catalyst preparation conditions
transition metal compound: diphenylmethylene (cyclopentadienyl-2,7-di-t-butylfluorenyl) zirconium dichloride
organic aluminum compound: triisobutylaluminum

EXAMPLE 9

[Preparation of Modified Clay Compound]

N,N-dimethyl-p-n-butylaniline hydrochloride (4.8 g, 22.5 mmol) was dissolved in 150 ml of adequately degasified water in a 300 ml flask. After then adding, with stirring, 9.5 g of high purity montmorillonite (tradename: Kunipia, product of Kunimine Industries; ion exchange capacity: 115.0 meq/100 g), stirring was continued for 24 hours. After filtering the mixture, it was washed with water and ethanol and dried under reduced pressure at room temperature to obtain a modified clay compound.

[Preparation of Catalyst Suspension]

After suspending 1.0 g of the modified clay compound obtained above in 56 ml of toluene in a 300 ml Schlenk's flask, 2.8 ml of a triethylaluminum solution (1.44 mol/l, toluene solvent) was added thereto and the mixture was stirred for one hour. Separately, a solution of 37.6 mg (67.5 μmol) of diphenylmethylene(cyclopentadienyl)(fluorenyl) zirconium dichloride, 40 ml of toluene and 9.4 ml of a triethylaluminum solution (1.44 mol/l, toluene solvent) was prepared in a 50 ml Schlenk's flask, and 29.2 ml of this solution was added to the above modified clay compound suspension and stirred for 12 hours to obtain a catalyst suspension.

[Solution Polymerization]

After nitrogen purging of a 1 liter autoclave, 600 ml of a $C_9$–$C_{13}$ saturated hydrocarbon solvent (IP Solvent 1620, product of Idemitsu Petroleum Chemical Co.) and 20 ml of 1-hexene were added thereto, the internal pressure of the autoclave was adjusted to 21 kgf/cm² with ethylene and the temperature of the autoclave was set to 160° C. Next, 12 ml of decane containing 1.1 ml (0.5 μmol in terms of Zr) of the catalyst suspension synthesized by the method described above was added to the autoclave, and polymerization was conducted for 10 minutes. The temperature of the autoclave reached 190° C. After completion of the polymerization reaction, the unreacted ethylene was removed and ethanol was poured into the reaction vessel to obtain 61.3 g of polymer. The properties of the resulting polymer are shown in Table 3.

EXAMPLE 10

A modified clay compound was prepared by the same method as Example 9 except that synthetic hectolite (tradename: Laponite, product of Nihon Silica Industries) was used instead of high purity montmorillonite for preparation of the modified clay compound.

Preparation of the catalyst suspension and polymerization were carried out by the same method in Example 9 except that the modified clay compound prepared here was used. The results are shown in Table 3.

EXAMPLE 11

A modified clay compound was prepared by the same method as Example 9 except that 5.24 g (22.8 mmol) of N,N-dimethyl-p-trimethylsilylaniline hydrochloride was used instead of N,N-dimethyl-p-n-butylaniline hydrochloride, and 150 ml of ethanol was used as the solvent instead of water, for preparation of the modified clay compound.

Preparation of the catalyst suspension and polymerization were carried out by the same method in Example 9 except that the modified clay compound prepared here was used. The results are shown in Table 3.

COMPARATIVE EXAMPLE 9

A modified clay compound was prepared by the same method as Example 9 except that 3.6 g (22.8 mmol) of N,N-dimethylaniline hydrochloride was used instead of N,N-dimethyl-p-n-butylaniline hydrochloride for preparation of the modified clay compound.

Preparation of the catalyst suspension and polymerization were carried out by the same method in Example 9 except that the modified clay compound prepared here was used. The results are shown in Table 3.

Examples 9–11 and Comparative Example 9 given above demonstrate that by using catalysts for olefin polymerization which comprise a transition metal compound (a), a modified clay compound (b) which has been modified with a proton acid salt of an aniline derivative with a substituent on the benzene ring, and an organic aluminum compound (c), it is possible to produce olefin polymers with activity and initial activity exceeding that achieved when using modified clay compounds which have been modified with aniline derivatives whose benzene ring portions are unsubstituted.

EXAMPLE 12

A modified clay compound was prepared by the same method as Example 9 except that 4.7 g (22.8 mmol) of N,N-dimethyl-1-naphthylamine hydrochloride was used instead of N,N-dimethyl-p-n-butylaniline hydrochloride for preparation of the modified clay compound.

Preparation of the catalyst suspension and polymerization were carried out by the same method in Example 9 except that the modified clay compound prepared here was used. The results are shown in Table 3.

EXAMPLE 13

The modified clay compound synthesized in Example 12 was allowed to stand in air for one week, and no change was seen in the appearance of the modified clay compound. Preparation of the catalyst suspension and polymerization were carried out under the same conditions as in Example 9 except that the modified clay compound prepared here was used for preparation of the catalyst suspension. The results are shown in Table 3.

COMPARATIVE EXAMPLE 10

The modified clay compound synthesized in Comparative Example 9 was allowed to stand in air for one week, during which time it underwent blue coloration. Preparation of the catalyst suspension and polymerization were carried out under the same conditions as in Example 9 except that the modified clay compound prepared here was used for preparation of the catalyst suspension. The results are shown in Table 3.

Examples 12 and 13 and Comparative Example 10 given above demonstrate that a modified clay compound (b) which has been modified with a proton acid salt of an aniline derivative with a substituent in the benzene ring has superior storage stability than a modified clay compound which has been modified with an aniline derivative with no substituent in the benzene ring, and thus allows a reduction in the number of steps for preparation and storage of the modified clay compound.

EXAMPLE 14

A modified clay compound was prepared by the same method as Example 9 except that 3.9 g (22.8 mmol) of N,N,2-trimethylaniline hydrochloride was used instead of e N,N-dimethyl-p-n-butylaniline hydrochloride for preparation of the modified clay compound.

Preparation of the catalyst suspension and polymerization were carried out by the same method in Example 9 except that the modified clay compound prepared here was used. The results are shown in Table 3.

EXAMPLE 15

A modified clay compound was prepared by the same method as Example 9 except that 3.6 g (22.8 mmol) of 2,6-dimethylaniline hydrochloride was used instead of N,N-dimethyl-p-n-butylaniline hydrochloride for preparation of the modified clay compound.

Preparation of the catalyst suspension and polymerization were carried out by the same method in Example 9 except that the modified clay compound prepared here was used. The results are shown in Table 3.

COMPARATIVE EXAMPLE 11

A modified clay compound was prepared by the same method as Example 9 except that 3.3 g (22.8 mmol) of 2,6-dimethylpyridine hydrochloride was used instead of N,N-dimethyl-p-n-butylaniline hydrochloride for preparation of the modified clay compound.

Preparation of the catalyst suspension and polymerization were carried out by the same method in Example 9 except that the modified clay compound prepared here was used. The results are shown in Table 3.

COMPARATIVE EXAMPLE 12

A modified clay compound was prepared by the same method as Example 9 except that 2.6 g (22.8 mmol) of pyridine hydrochloride was used instead of N,N-dimethyl-p-n-butylaniline hydrochloride and synthetic hectolite (tradename: Laponite, product of Nihon Silica Industries) was used instead of high purity montmorillonite for preparation of the modified clay compound.

Preparation of the catalyst suspension and polymerization were carried out by the same method in Example 9 except that the modified clay compound prepared here was used. The results are shown in Table 3.

COMPARATIVE EXAMPLE 13

A modified clay compound was prepared by the same method as Example 9 except that 5.1 g (22.8 mmol) of tri-n-butylaniline hydrochloride was used instead of N,N-dimethyl-p-n-butylaniline hydrochloride and synthetic hectolite (tradename: Laponite, product of Nihon Silica Industries) was used instead of high purity montmorillonite for preparation of the modified clay compound.

Preparation of the catalyst suspension and polymerization were carried out by the same method in Example 9 except that the modified clay compound prepared here was used. The results are shown in Table 3.

TABLE 3

| | Amine | Clay | Other conditions | Activity kg/mmolZr | A1/A10 % | A2/A10 % | MI g/10 min | Tm ° C. |
|---|---|---|---|---|---|---|---|---|
| Example 9 | N,N-dimethyl-p-n-butylaniline | montmorillonite | | 147.0 | 48.8 | 66.7 | 12.0 | |
| Example 10 | N,N-dimethyl-p-n-butylaniline | hectolite | | 189.6 | | | 24.0 | |
| Example 11 | N,N-dimethyl-p-trimethylsilylaniline | montmorillonite | | 140.6 | 34.1 | 56.0 | 13.6 | |
| Comp. Example 9 | N,N-dimethylaniline | montmorillonite | | 95.6 | 23.1 | 48.1 | 19.6 | |
| Example 12 | N, N-dimethyl-1-naphthylamine | montmorillonite | | 146.8 | 22.9 | 47.9 | 16.4 | 112.8 |

TABLE 3-continued

|  | Amine | Clay | Other conditions | Activity kg/mmolZr | A1/A10 % | A2/A10 % | MI g/10 min | Tm °C. |
|---|---|---|---|---|---|---|---|---|
| Example 13 | N,N-dimethyl-1-naphthylamine | montmorillonite | atmosphere one week | 133.8 | 23.8 | 45.2 | 12.2 | |
| Comp. Example 10 | N,N-dimethylaniline | montmorillonite | atmosphere one week | 69.2 | 12.8 | 33.3 | 9.4 | |
| Example 14 | N,N,2-trimethylaniline | montmorillonite | | 138.0 | 25.6 | 53.8 | 11.0 | 112.8 |
| Example 15 | 2,6-dimethylaniline | montmorillonite | | 125.8 | 11.1 | 41.7 | 14.0 | 111.5 |
| Comp. Example 11 | 2,6-dimethylpyridine | montmorillonite | | 38.3 | 8.3 | 25.0 | 3.3 | |
| Comp. Example 12 | pyridine | hectolite | | 21.0 | | | 5.3 | 108 |
| Comp. Example 13 | tri-n-butylamine | hectolite | | 56 | | | 2.2 | 116 |

Catalyst: $Ph_2C(Cp)(Flu)ZrCl_2/Et_3Al$/modified clay = 1 mmol/300 mmol/25 g toluene solution
Polymerization conditions
catalyst: 0.5 μmol Zr
600 ml IP solvent, 20 kg/cm²G ethylene, 20 ml hexene
polymerization start temperature: 160° C.
polymerization time: 10 minutes

EXAMPLE 16

After adding 0.5 g of the modified clay compound prepared in Example 1, 30 ml of toluene and 2.6 mmol of triisobutylaluminum to a 100 ml Schlenk's flask, 30 μmol of bis(1,3-dimethylcyclopentadienyl) zirconium dichloride was added thereto and the mixture was stirred at room temperature overnight. The supernatant was removed to obtain a hexane suspension.

[Hexane Slurry Polymerization]

After nitrogen exchange in a 2 liter stainless steel autoclave, 1 liter of hexane, 2.2. mmol of triisobutylaluminum and the catalyst slurry prepared above (corresponding to 50 mg of solid catalyst) were added thereto, and then ethylene was introduced to an ethylene pressure of 6 kg/cm² for one hour of polymerization at a temperature of 80° C. After completion of the reaction, the unreacted ethylene was removed and the reaction solution was poured into ethanol to obtain 116 g of a particulate polymer. The MFR of the resulting polymer was 0.02 g/10 minutes.

EXAMPLE 17

Preparation of a catalyst suspension and polymerization of hexane slurry were accomplished by the same method as in Example 16, except that bis(indenyl) zirconium dichloride was used instead of bis(1,3-dimethylcyclopentadienyl) zirconium dichloride for preparation of the catalyst suspension, and this yielded 186 g of a particulate polymer. The MFR of the resulting polymer was 0.25 g/10 minutes.

EXAMPLE 18

[Preparation of Catalyst Suspension]

100 mg of the modified clay compound prepared according to the procedures for preparation of modified clay compound as in Example 9, 0.83 mg of ethylenebis(indenyl) zirconium dichloride and 0.2 mmol of triisobutylaluminum were stirred in 20 ml of toluene for 10 minutes.

[Polymerization of Propylene]

After nitrogen purging of a 2 liter stainless steel autoclave, 500 ml of toluene was added thereto and then the catalyst suspension prepared above (corresponding to 100 mg of the catalyst) and 2.2 mmol of triisobutylaluminum were added. Then, 500 ml of propylene was introduced and polymerization was carried out at a temperature of 60° C. for one hour. After the completion of the reaction, the unreacted propylene was removed to obtain 66 g of polymer. The obtained polymer had a melting point of 132° C.

EXAMPLE 19

[Preparation of Catalyst Suspension]

25 mg of the modified clay compound prepared according to the procedures for preparation of modified clay compound as in Example 9, 0.56 mg of diphenylmethylene (cyclopentadienyl) (fluorenyl) zirconium dichloride and 0.2 mmol of triisobutylaluminum were stirred in 20 ml of toluene for 15 hours.

[Polymerization of Propylene]

After nitrogen purging of a 5 liter stainless steel autoclave, 1000 ml of toluene was added thereto and then the catalyst suspension prepared above (corresponding to 25 mg of the catalyst) and 2.2 mmol of triisobutylaluminum were added. Then, 1000 ml of propylene was introduced and polymerization was carried out at a temperature of 40° C. for one hour. After the completion of the reaction, the unreacted propylene was removed to obtain 8 g of polymer. The obtained polymer had a melting point of 105° C.

Examples 9–19 and Comparative Examples 9–13 given above demonstrate the distinctive effect of the present invention. In other words, they show that it is possible to produce olefin polymers with a high degree of productivity by using catalysts for olefin polymerization which comprise a transition metal compound (a), an organic aluminum compound (c) and a modified clay compound (b) which has been modified with a proton acid salt of an amine compound (b-3) having a specific structure.

As explained above, the catalysts according to the present invention described in this specification exhibit a high activity for polymerization of olefins and make the preparation of polymers of a high molecular weight possible and, in addition, can achieve improved polymerization behavior under high temperature conditions and provide olefin polymers at a high productivity with low ash content.

What is claimed is:

1. A catalyst for olefin polymerization which consists essentially of a transition metal compound (a), a modified clay compound (b) and an organic aluminum compound (c), wherein the modified clay compound (b) comprises a reaction product of (b-1) and a proton acid salt of (b-2) which are defined as follows:

(b-1) clay mineral, (b-2) amine compound represented by the following general formula (1) or (2)

$R^1_3N$ (1)

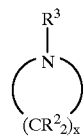
(2)

wherein $R^1$ represents a hydrogen atom or an alkyl, alkenyl, or aralkyl, each of which may be the same or different provided that at least one $R^1$ is a hydrocarbon group of 6 or more carbon atoms, $R^2$ and $R^3$ may be the same or different and each represent a hydrogen atom or a hydrocarbon group of 1–20 carbon atoms, and x is 4 or 5.

2. A catalyst for olefin polymerization which consists essentially of a transition metal compound (a), a modified clay compound (b) and an organic aluminum compound (c), wherein the modified clay compound (b) comprises a reaction product of (b-1) and a proton acid salt of (b-3) which are defined as follows:

(b-1) clay mineral, (b-3) amine compound represented by the following general formula (3)

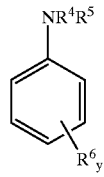
(3)

wherein $R^4$ and $R^5$ each represent a hydrogen atom or a hydrocarbon group of 1–20 carbon atoms, and each may be the same or different, $R^6$ represents a hydrocarbon, oxygen-containing hydrocarbon or nitrogen-containing hydrocarbon group of 1–20 carbon atoms, a silicon-containing hydrocarbon group of 3–20 carbon atoms or a halogen atom, and each may be the same or different, or the 2 $R^6$ groups may together form a ring, and y is 1 or 2.

* * * * *